United States Patent
Pokhil

[19]

[11] Patent Number: 6,097,578
[45] Date of Patent: Aug. 1, 2000

[54] BOTTOM SHIELD DESIGN FOR MAGNETIC READ HEADS

[75] Inventor: Taras G. Pokhil, Arden Hills, Minn.

[73] Assignee: Seagate Technology, Inc., Scotts Valley, Calif.

[21] Appl. No.: 09/203,415

[22] Filed: Dec. 2, 1998

Related U.S. Application Data

[60] Provisional application No. 60/074,769, Feb. 17, 1998.

[51] Int. Cl.[7] .................................. G11B 5/11; G11B 5/39
[52] U.S. Cl. ............................................................. 360/319
[58] Field of Search ..................................... 360/113, 125, 360/126, 128, 319

[56] References Cited

U.S. PATENT DOCUMENTS

| | | | |
|---|---|---|---|
| 4,750,072 | 6/1988 | Takagi ..................................... | 360/126 |
| 4,802,043 | 1/1989 | Sato et al. ............................... | 360/113 |
| 4,803,580 | 2/1989 | Mowry .................................... | 360/113 |
| 4,814,921 | 3/1989 | Hamakawa et al. .................... | 360/126 |
| 4,821,133 | 4/1989 | Mowry et al. .......................... | 360/113 |
| 4,843,506 | 6/1989 | Gill et al. ................................ | 360/113 |
| 4,900,650 | 2/1990 | Das .......................................... | 430/319 |
| 4,912,584 | 3/1990 | Mallary et al. ......................... | 360/126 |
| 4,967,298 | 10/1990 | Mowry .................................... | 360/113 |
| 5,032,945 | 7/1991 | Argyle et al. ........................... | 360/126 |
| 5,085,935 | 2/1992 | Mallary ................................... | 428/336 |
| 5,208,715 | 5/1993 | Mowry .................................... | 360/113 |
| 5,515,221 | 5/1996 | Gill et al. ................................ | 360/113 |
| 5,621,592 | 4/1997 | Gill et al. ................................ | 360/113 |
| 5,940,250 | 8/1999 | McNeil et al. ......................... | 360/104 |

*Primary Examiner*—Jefferson Evans
*Attorney, Agent, or Firm*—Kinney & Lange, P.A.

[57] ABSTRACT

A bottom shield for use in a magnetic read head is disclosed. The bottom shield has a ferromagnetic layer that has a length and an outer width. The ferromagnetic layer has a first edge, a second edge opposite the first edge, and an air bearing surface. The first edge and the second edge are each normal to the air bearing surface. A plurality of notches are located along both the first edge and the second edge. The plurality of notches form a plurality of narrow widths that are each narrower than the outer width so that one of a plurality of magnetic domain walls is located at each of the plurality of narrow widths.

16 Claims, 6 Drawing Sheets

BOTTOM SHIELD DESIGN FOR MAGNETIC READ HEADS

CROSS-REFERENCE TO RELATED APPLICATION

This application claims priority from provisional application Ser. No. 60/074,769, filed Feb. 17, 1998 for "Bottom Shield Design For GMR Heads" of Taras Grigoryevich Pokhil.

BACKGROUND OF THE INVENTION

The present invention relates generally to the field of electronic data storage and retrieval. In particular, the present invention relates to a bottom shield design of a magnetoresistive reader that eliminates magnetic interactions between the magnetic read head bottom shield and a magnetic read element by preventing displacement of any of a plurality of domain walls within the bottom shield.

A magnetic read head retrieves magnetically-encoded information that is stored on a magnetic medium or disc. The magnetic read head is typically formed of several layers that include a top shield, a bottom shield, and a read element positioned between the top and bottom shields. A resistance of the read element fluctuates in response to magnetic fields emanating from the rotating magnetic disc when the read element is positioned near the magnetic disc. The change in resistance of the read element can be detected by passing a sense current through the read element and measuring a voltage across the read element. External circuitry then converts the voltage information into an appropriate format and manipulates that information as necessary.

During a read operation, the top and bottom shields ensure that the read element reads only the information stored directly beneath it on the magnetic medium or disc by absorbing any stray magnetic fields emanating from adjacent tracks and transitions. Within the bottom shield exists a plurality of magnetic domains. The magnetic domains are separated by one of a plurality of magnetic domain walls. Each domain has a magnetization that is oriented in a direction different than the magnetization of all adjacent domains. The application of an external magnetic field to the bottom shield can cause the magnetization of each of the domains to rotate, thereby causing the domains to move, grow or shrink. Thus, the domain walls are relocated due to the external magnetic field. This movement of a domain wall through a portion of the bottom shield that is directly beneath the read element causes a local perturbation of the spin structure within the read element and, therefore, produces an unwanted change in the resistance of the read element.

Until recently, the noise induced by domain wall movement has been negligible. But as storage densities on magnetic media and discs have increased, the reads elements have necessarily become smaller, more sensitive, and also more susceptible to noise created by domain wall movement. Therefore there is a need for a bottom shield design that prevents domain wall movement.

BRIEF SUMMARY OF THE INVENTION

The present invention is a bottom shield design for use in a magnetic read head that prevents displacement of a plurality of domain walls contained therein. The bottom shield is a ferromagnetic layer having a length and an outer width. The ferromagnetic layer has a first edge, a second edge opposite the first edge, and an air bearing surface. The first edge and the second edge are each normal to the air bearing surface. A plurality of notches are located along both the first edge and the second edge. The plurality of notches form a plurality of narrow widths that are each narrower than the outer width so that one of a plurality of magnetic domain walls is located at each of the plurality of narrow widths.

DETAILED DESCRIPTION

Figure 1:
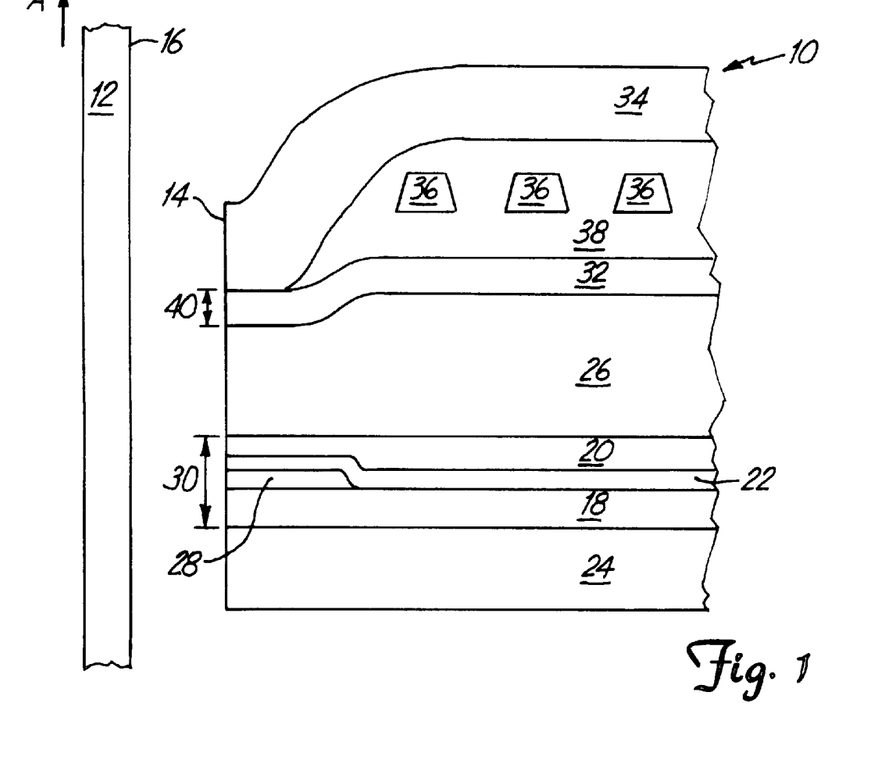
FIG. 1 is a cross-sectional view of a magnetic read/write head and a magnetic disc taken along a plane normal to an air bearing surface of the read/write head.

FIG. 1 is cross-sectional view of magnetic read/write head 10 and magnetic disc 12 taken along a plane normal to air bearing surface 14 of read/write head 10. FIG. 1 illustrates magnetic read/write head 10 and its placement relative to magnetic disc 12. Air bearing surface 14 of magnetic read/write head 10 faces disc surface 16 of magnetic disc 12. Magnetic disc 12 travels or rotates in a direction relative to magnetic read/write head 10 as indicated by arrow A. A spacing between air bearing surface 14 and disc surface 16 is preferably minimized while avoiding contact between magnetic read head 10 and magnetic disc 12.

A reader portion of read/write head 10 includes bottom gap layer 18, top gap layer 20, metal contacts 22, bottom shield 24, top shield/shared pole 26, and read element 28. Read gap 30 is defined on air bearing surface 14 between bottom shield 24 and top shield 26. Metal contacts 22 are positioned between bottom gap layer 18 and top gap layer 20, and read element 28 is positioned between terminating ends of bottom gap layer 18 and metal contacts 22.

A writer portion of read/write head 10 includes top shield/shared pole 26, write gap layer 32, top pole 34, conductive coils 36, and polymer layer 38. Write gap 40 is defined on air bearing surface 14 by write gap layer 32 between terminating ends of top pole 34 and top shield 26. hi addition to acting as a shield, top shield 26 also functions as a shared pole for use in conjunction with top pole 34. Electrically conductive coils 36 are provided to generate magnetic fields across write gap 40 and are positioned in polymer layer 38 between top pole 34 and write gap layer 32. Although only one layer of coils is shown in FIG. 1, it should be understood that there may be multiple layers of coils.

Figure 2:
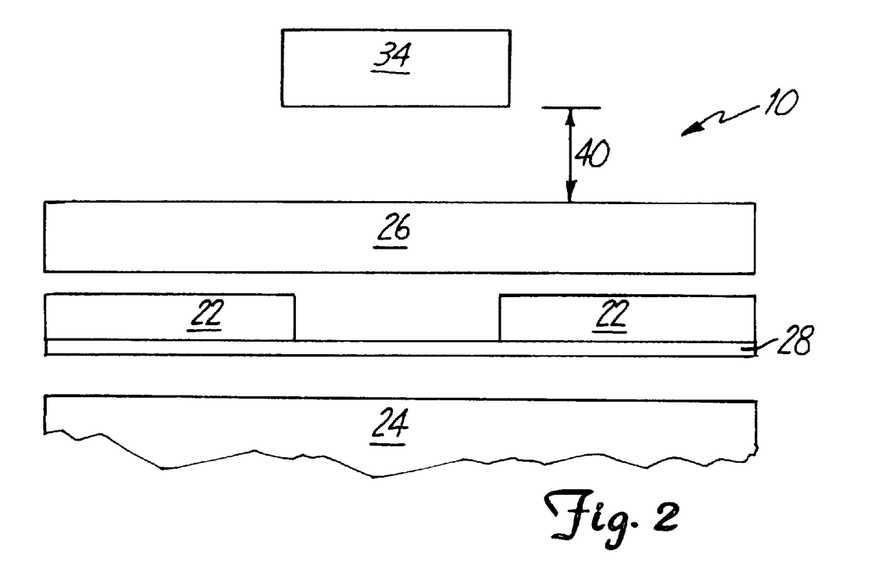
FIG. 2 is a layer diagram of a magnetic read/write head.

FIG. 2 is a layer diagram of magnetic read/write head 10. FIG. 2 illustrates the location of a plurality of magnetically significant elements in magnetic read/write head 10 as they appear along air bearing surface 14 of magnetic read/write head 10 of FIG. 1. In FIG. 2, all spacing and insulating layers are omitted for clarity. Bottom shield 24 and top shield 26 are spaced to provide for a location of read element 28. Read element 28 has two passive regions defined as the portions of read element 28 positioned adjacent to metal contacts 22. An active region of read element 28 is defined as the portion of read element 28 located between the two passive regions of read element 28. The active region of read element 28 defines a read sensor width.

Read element 28 is preferably a magnetoresistive (MR) element or a giant magnetoresistive (GMR) stack. A MR element is generally formed of a ferromagnetic material whose resistance fluctuates in response to an external magnetic field. By providing a sense current through the MR element, a resistance of the MR element can be measured and used by external circuitry to decipher the information stored on the magnetic medium or disc. A GMR stack operates similarly, but allows for a more pronounced MR effect.

Figure 3:
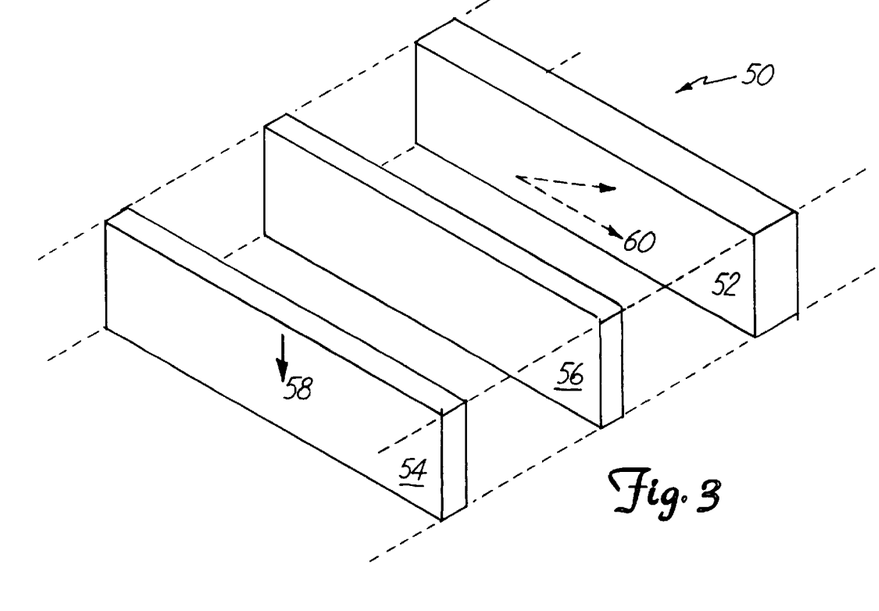
FIG. 3 is an expanded view of a giant magnetoresistive stack.

FIG. 3 is an expanded view of GMR stack 50. GMR stack 50 is generally formed of three layers, ferromagnetic free layer 52, ferromagnetic pinned layer 54, and nonmagnetic spacer layer 56 positioned between free layer 52 and pinned layer 54. Pinned magnetization 58 of pinned layer 54 is held constant while free magnetization 60 of free layer 52 is free to rotate in response to an external magnetic field (not shown in FIG. 3). A resistivity of GMR stack 50 varies as a function of an angle between free magnetization 60 and pinned magnetization 58. As is known in the field of magnetic read/write head design, GMR stack 50 may contain additional layers.

Figure 4:
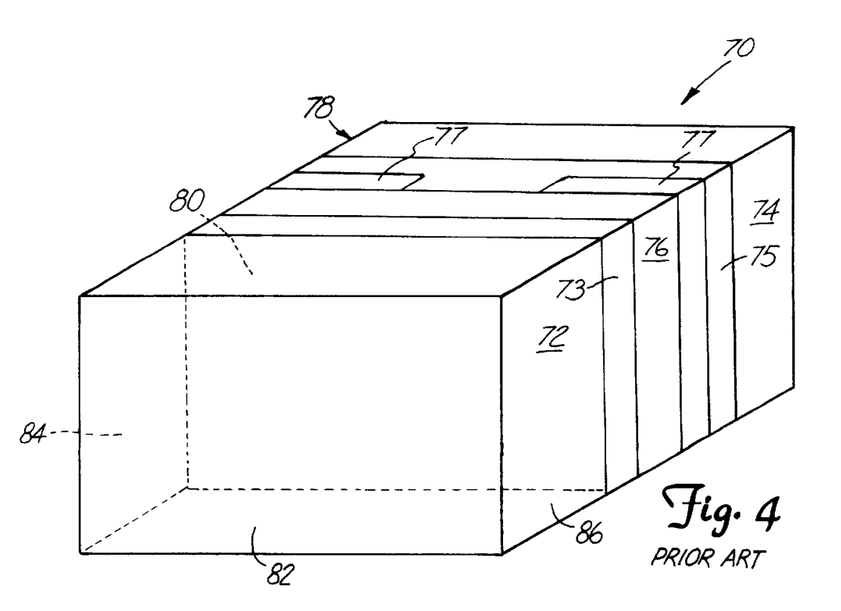
FIG. 4 is a partial perspective view of a magnetic read/write head that includes a bottom shield of the prior art.

FIG. 4 is a partial perspective view of magnetic read head 70 that generally includes bottom shield 72 of the prior art, bottom gap layer 73, metal contacts 77, read element 76, top gap layer 75, and top shield 74. Read element 76 is positioned between bottom gap layer 73 and a combination of metal contacts 77 and top gap layer 75. Bottom gap layer 73 is positioned between read element 76 and bottom shield 72. Top gap layer 75 is positioned between top shield 74 and a combination of read element 76 and metal contacts 77. Metal contacts 77 are positioned between read element 76 and top gap layer 75. Magnetic read head 70 has air bearing surface 78.

As shown in FIG. 4, bottom shield 72 has a rectangular shape. Bottom shield 72, however, could have other forms, such as, a circle or a square with a lip extending from one edge. Bottom shield 72 has first surface 80, shown in phantom, proximate read element 76 and second surface 82 opposite first surface 80. Third surface 84, shown in phantom, is opposite fourth surface 86 such that third surface 84 and fourth surface 86 connect first surface 80 to second surface 82. For ease of explanation of magnetic read head 70 and its components, thicknesses of bottom shield 72, bottom gap layer 73, top shield 74, top gap layer 75, and read element 76 and metal contacts 77, as shown in FIG. 4, are exaggerated.

Figure 5:
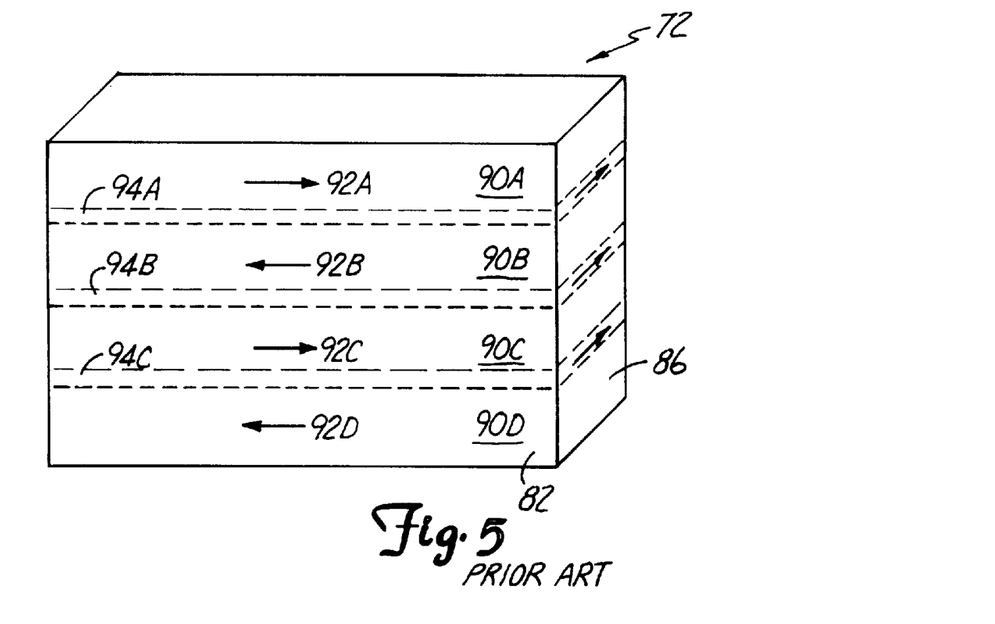
FIG. 5 is a perspective view of a bottom shield of the prior art operating under no external magnetic fields.

FIG. 5 is a perspective view of bottom shield 72 of the prior art with no external magnetic fields being exerted upon it. Bottom shield 72 contains a plurality of magnetic domains 90A, 90B, 90C and 90D, hereinafter referred to as magnetic domains 90. Each of the plurality of magnetic domains 90 has a magnetization 92A, 92B, 92C and 92D, hereinafter referred to as magnetization 92, directed in a direction different than the magnetization of its adjacent magnetic domains 90. Separating the adjacent magnetic domains 90 are a plurality of domain walls 94A, 94B and 94C, hereinafter referred to as domain walls 94. Each of the plurality of domain walls 94 has a magnetization 95A, 95B, and 95C, hereinafter referred to as magnetization 95. Magnetization 95 is directed normal to first and second surfaces 80 and 82, or toward read element 76. With no magnetic field being exerted on the bottom shield 72, each of the magnetic domains 90 is equally sized and the magnetization 92 of each of the plurality of magnetic domains 90 is directed parallel to the domain walls 94.

Figure 6:
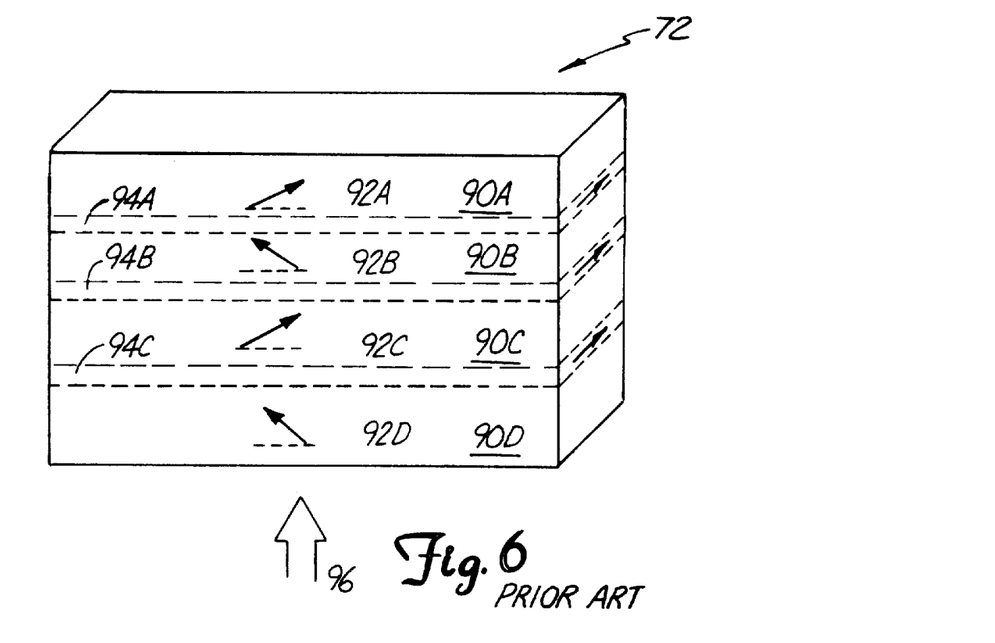
FIG. 6 is a perspective view of a bottom shield of the prior art operating under an external magnetic field from a magnetic media.

FIG. 6 is a perspective view of bottom shield 72 of the prior art with external field 96 being exerted upon it. External field 96 causes magnetization 92 of each of the plurality of magnetic domains 90 to rotate toward the direction of external field 96. This rotation of the magnetization 92 can cause each of the plurality of domain walls 94 to move upward, as shown in FIG. 6. When any of the plurality of domain walls 94 passes through a portion of bottom shield 72 directly covering read element 76, magnetization 95 causes a local perturbation in read element 76 that results in noise and instability.

Figure 7:
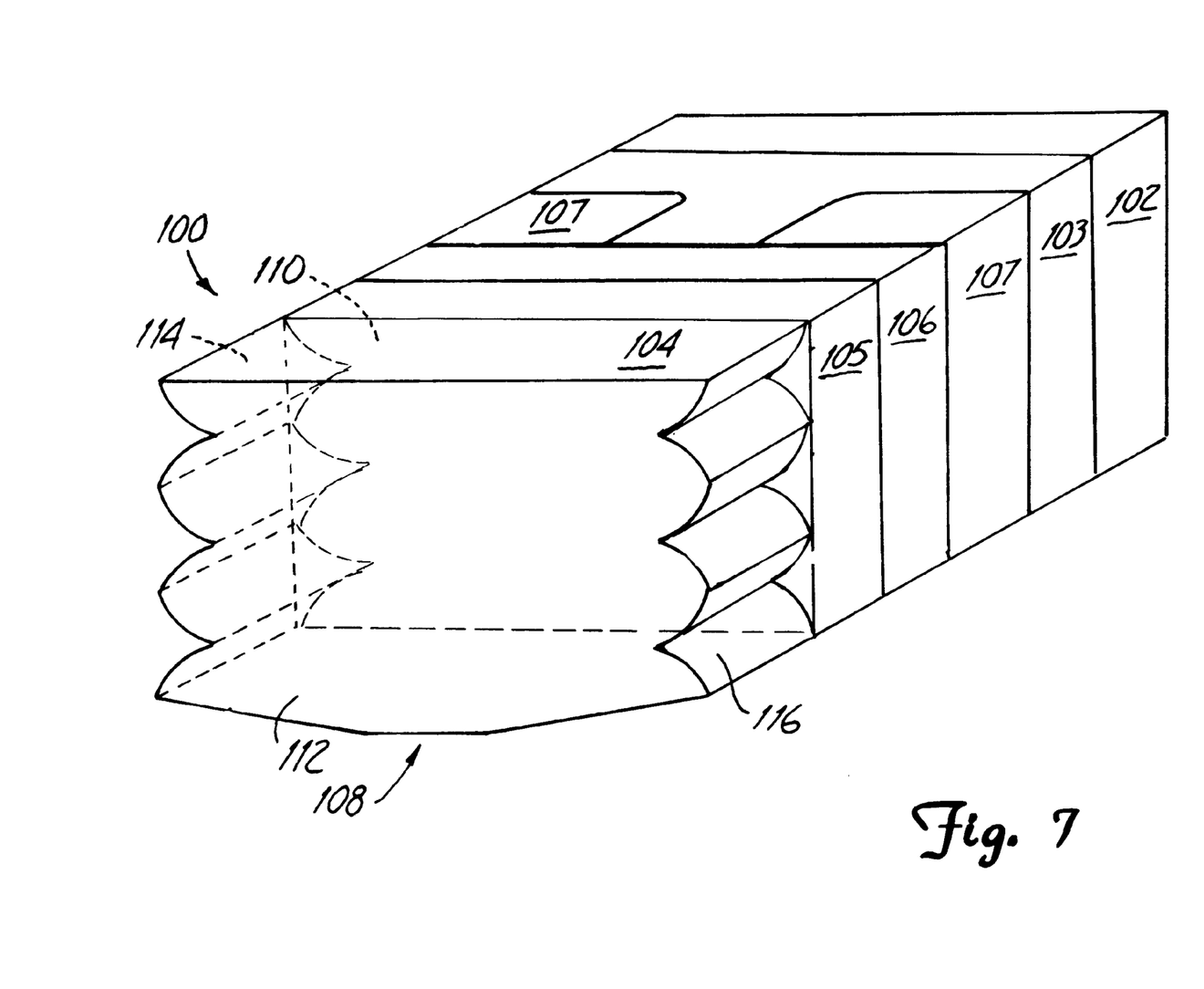
FIG. 7 is a partial perspective view of a magnetic read/write head that includes a bottom shield of the present invention.

FIG. 7 is a partial perspective view of magnetic read head 100 that incorporates the present invention and includes top shield 102, top gap layer 103, bottom shield 104, bottom gap layer 105, read element 106, and metal contacts 107. Read element 106 is positioned between bottom gap layer 105 and a combination of top gap layer 103 and metal contacts 107. Top gap layer 103 is positioned between top shield 102 and a combination of read element 106. Bottom gap layer is positioned between bottom shield 104 and read element 106 and metal contacts 107. Metal contacts 107 are positioned between read elemen 106 and topgap layer 103. Magnetic read head 100 has air bearing surface 108 that is shown in FIG. 4 as a bottom surface of magnetic read head 100. Bottom shield 104 is shaped according to the design of the present invention. Bottom shield 104 and top shield 102 isolate read element 106 from stray magnetic fields emanating from adjacent data tracks or transitions on a magnetic medium or disc (not shown in FIG. 7) by absorbing any stray magnetic fields. Bottom shield 104 has first surface 110, shown in phantom, proximate read element 106 and second surface 112 opposite first surface 110. Bottom shield 104 also has third surface 114, shown in phantom, opposite fourth surface 116. Third surface 114 and fourth surface 116 join first surface 110 to second surface 112. For ease of explanation of magnetic read head 100 and its components, thicknesses of bottom shield 104, bottom gap layer 105, top gap layer 103, top shield 102, read element 106 and metal contacts 107, as shown in FIG. 7, are exaggerated. In general, bottom shield 104, bottom gap layer 105, top gap layer 103, top shield 102, read element 106 and metal contacts 107 are thin layers each having a thickness in the range of 2 micrometers to 3 micrometers.

Figure 8:
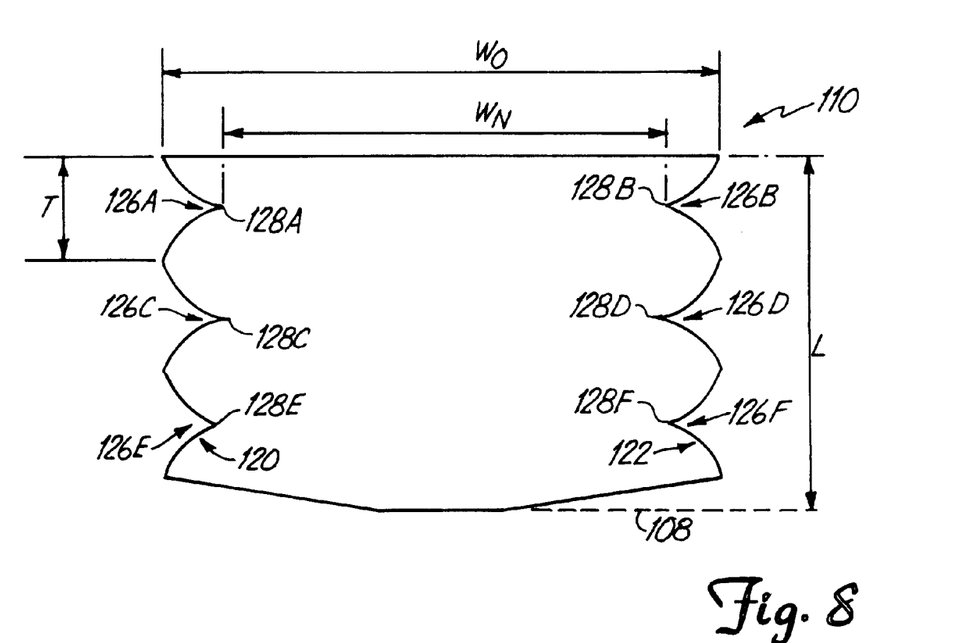
FIG. 8 is a cross-sectional view of a bottom shield of the present invention.

FIG. 8 is a view of first surface 110 of bottom shield 104 of the present invention. Bottom shield 104 is formed of a ferromagnetic layer having length L and outer width $W_O$. First surface 110 has first edge 120 opposite second edge 122. First edge 120 and second edge 122 are each normal to air bearing surface 108 of magnetic read head 100. Along first edge 120 are a plurality of notches 126A, 126C, and 126E, and along second edge 122 are a plurality of notches 126B, 126D, and 126F. For simplicity, a nonspecific reference to any one of the plurality of notches 126A, 126B, 126C, 126D, 126E, or 126F will be to a plurality of notches 126. Each of the plurality of notches 126 has a corresponding valley 128A, 128B, 128C, 128D, 128E, and 128F, hereinafter referred to as valleys 128, located at the innermost point of one of the plurality of notches 126. The plurality of notches 126 form a plurality of narrow widths $W_N$ that are each narrower than outer width $W_O$. In a preferred embodiment, a positioning of each of the plurality of notches 126 is periodic with period T.

Figure 9:
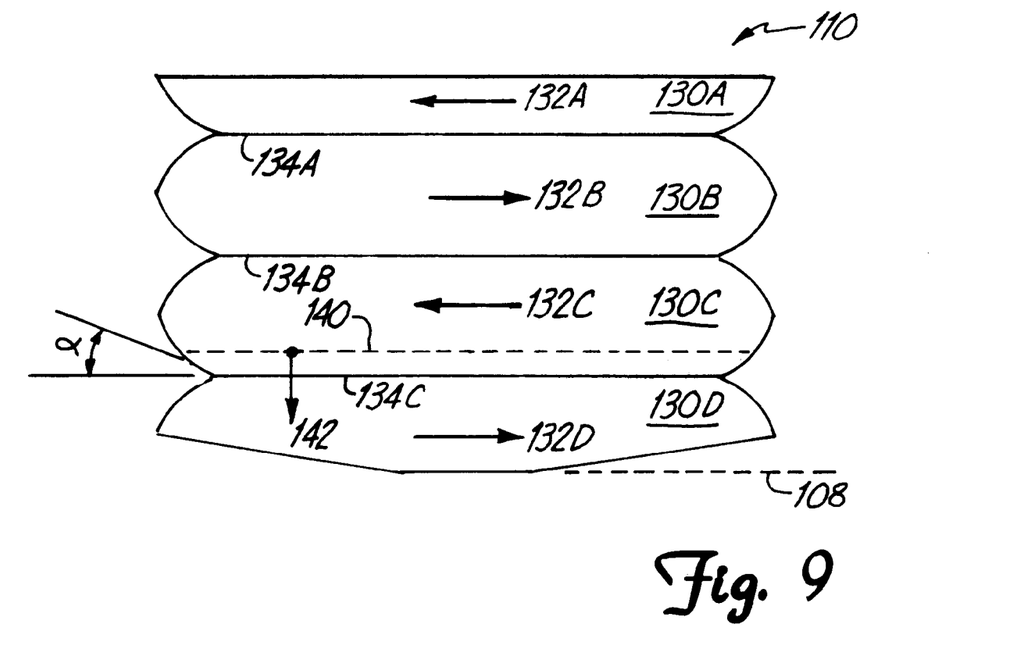
FIG. 9 is a cross-sectional view of a bottom shield of the present invention operating under no external magnetic fields.

FIG. 9 is a view of first surface 110 of bottom shield 104 of the present invention. As shown, there are no external magnetic fields being exerted upon bottom shield 104. Bottom shield 104 is preferably formed of an anisotropic material having an easy axis parallel to both air bearing surface 108 and first surface 110. Bottom shield 104 contains a plurality of magnetic domains 130A, 130B, 130C and 130D, hereinafter referred to as magnetic domains 130. Within each of the plurality of magnetic domains 130 is magnetization 132A, 132B, 132C or 132D, hereinafter referred to as magnetization 132 (represented in FIG. 9 by an arrow). Magnetization 132 of each of the plurality of magnetic domains 130 is directed antiparallel to magnetization 132 of its adjacent magnetic domains 130. In FIG. 9, magnetization 132B and magnetization 132D are each antiparallel to magnetization 132A and magnetization 132C. Separating adjacent magnetic domains 130 are a plurality of domain walls 134A, 134B, 134C, hereinafter referred to as domain walls 134.

In a preferred embodiment, each of the plurality of notches 126A, 126C, or 126E along first edge 120 corresponds, respectively, to one of the plurality of notches 126B, 126D, or 126F along second edge 122. Furthermore, domain wall 134A preferably will be substantially parallel to air bearing surface 108 and will intersect first edge 120 at valley 128A of notch 126A and second edge 122 at valley 128B of notch 126B. Similarly, each of the plurality of domain walls 134 preferably will be substantially parallel to air bearing surface 108 and will intersect first edge 120 at valley 128 of one of the plurality of notches 126 along first edge 120 and second edge 122 at valley 128 of corresponding notch 126 along second edge 122. This arrangement of the plurality of domain walls 134 provides that one of the plurality of domain walls 134 is located at each of the plurality of narrow widths $W_N$ of bottom shield 104. While four magnetic domains 130 are shown in FIG. 9, the actual number of magnetic domains 130 may vary depending on the size, shape, and material of bottom shield 104.

The purpose of bottom shield 104 is to magnetically isolate read element 106 in magnetic read head 100 from stray external magnetic fields since the output of read element 106 is a function of the magnetic fields operating upon it. In a bottom shield of the prior art, the magnetic domains, as shown in FIG. 6, can change size and cause the domain walls to move. When the domain walls pass through a portion of the bottom shield that directly covers the read element, a local perturbation is caused in the read element resulting in unwanted noise and instability.

Bottom shield 104 of the present invention prevents each of the plurality of domain walls 134 from moving. Each of the domain walls 134 will naturally position themselves such that the energy of domain wall 134 is minimized. Since the energy of domain wall 134 is directly related to the length of domain wall 134, domain wall 134 will position itself so that its length is minimized. Within bottom shield 104, narrow width $W_N$ is defined by a distance between valley 128 of one of the plurality of notches 126 along first edge 120 and valley 128 of corresponding notch 126 along second edge 122. Since narrow width $W_N$ is necessarily less than outer width $W_O$, each of the plurality of domain walls 134 will naturally favor a position in bottom shield 104 having a width equal to narrow width $W_N$ and will stabilize as shown in FIG. 9.

Shown in phantom in FIG. 9 is displaced domain wall 140. Force 142 acts upon displaced domain wall 140 to return displaced domain wall 140 to its original location. Force 142 is dependent upon the shape of first edge 120 and second edge 122. Acute angle α is formed between an intersection of an extension of any of the plurality of magnetic domain walls 134 and first edge 120. Force 142 acting upon displaced domain wall 140 is proportional to the cotangent of acute angle α. Therefore, the smaller acute angle α, the larger force 142 acting upon displaced domain wall 140 to return it to its original location. Fabrication concerns are the only limitations on how small angle a can be.

To ensure that the domain structure in bottom shield 104 remains stable; that is, energetically favorable, period T of the positioning of the plurality of notches 126 along first edge 120 and second edge 122 is selected to equal an equilibrium domain period. A method of establishing the equilibrium domain period involves manufacturing a sample rectangular bottom shield of the same outer dimensions as bottom shield 104. The sample bottom shield should be demagnetized to place the sample bottom shield in an equilibrium state. The equilibrium state is reached when the total magnetic moment of the sample bottom shield equals zero. The average width, measured in a direction normal to an air bearing surface, of the magnetic domains within the sample bottom shield is the equilibrium domain period. By setting period T of the positioning of the plurality of notches 126 along first edge 120 and second edge 122 of bottom shield 104 to this equilibrium domain period, magnetic domains 130 of bottom shield 104 will be in a more stable state and a total number of magnetic domains 130 can be controlled.

Figure 10:
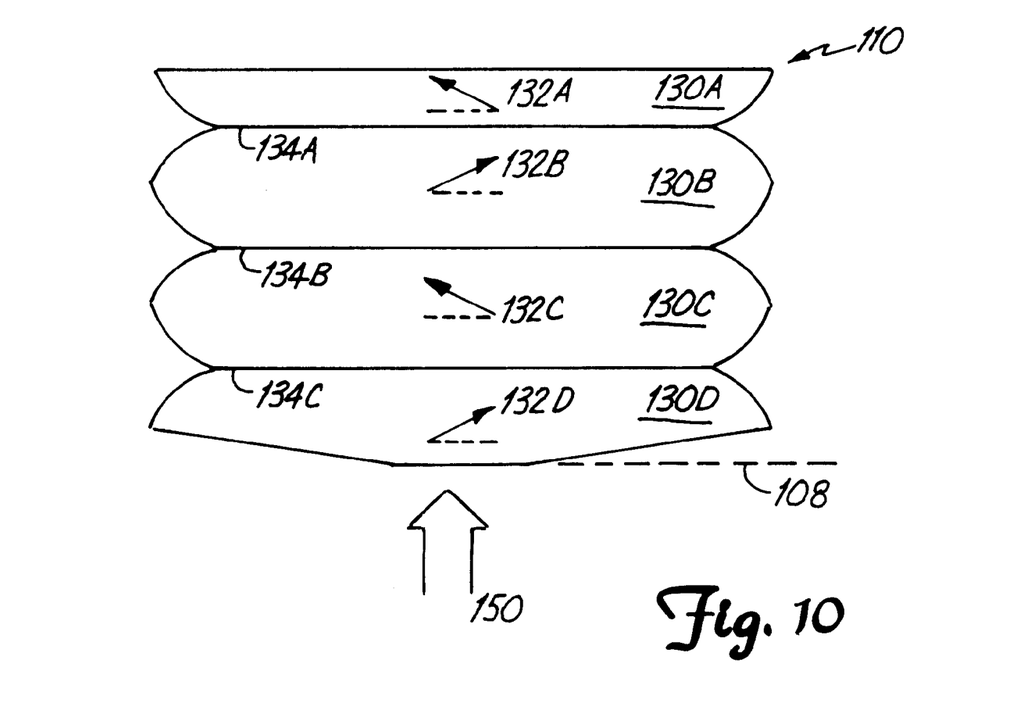
FIG. 10 is a cross-sectional view of the bottom shield of the present invention operating under an external magnetic field from a magnetic medium.

FIG. 10 shows bottom shield 104 of FIG. 7 with external magnetic field 150 being applied. External magnetic field 150 is an unwanted field from an adjacent track or transition on a magnetic disc (not shown in FIG. 10) and is applied normal to air bearing surface 108. Magnetization 132 of individual magnetic domains 130 has rotated an angle greater than 0° but less than 90°. As long as magnetization 132 of each of the plurality of domains 130 rotates less than 90°, the magnetization of bottom shield 104 will to become saturated in a direction normal to air bearing surface 108 (since the easy axis is directed parallel to air bearing surface 103); thereby preventing renucleation of domain walls 134 in random positions.

The material of bottom shield 104 and the strength of the magnetic anisotropy of bottom shield 104 is preferably such that bottom shield 104 will absorb magnetic field 150 by rotating more than zero degrees. However, the material and strength of bottom shield 104 should also be selected so that it will resist magnetic field 150 enough to prevent a full 90° rotation of magnetization 132. A 90° rotation of magnetization 132 will encourage the renucleation of domain walls 134 in bottom shield 104, while no rotation of magnetization 132 will permit magnetic field 150 to pass through bottom shield 104 to magnetic read element 106.

In conclusion, the bottom shield design of the present invention will prevent magnetic domain walls from moving within a bottom shield of a magnetic read head. The energy required for the magnetic domain walls to locate at the narrow widths of the bottom shield is much lower than the energy required for the magnetic domain walls to locate at the outer width of the bottom shield. By preventing magnetic domain wall movement within the bottom shield, the bottom shield will induce less unwanted noise upon the magnetic read element. As such, the present bottom shield design allows for the necessary reduction in size of magnetic read elements as the demand for increased storage densities increases.

Although the present invention has been described with reference to preferred embodiments, workers skilled in the art will recognize that changes may be made in form and detail without departing from the spirit and scope of the invention.

What is claimed is:

1. A bottom shield for use in a magnetic read head, the bottom shield comprising:
   a ferromagnetic layer having a length and an outer width, the ferromagnetic layer further having a first edge, a second edge opposite the first edge, and an air bearing surface, the first edge and the second edge each being normal to the air bearing surface; and
   a plurality of notches located along both the first edge and the second edge, the plurality of notches forming a plurality of narrow widths that are each narrower than the outer width so that one of a plurality of magnetic domain walls is located at each of the plurality of narrow widths.

2. The bottom shield of claim 1 wherein the ferromagnetic layer is formed of an anisotropic material having an easy axis parallel to the air bearing surface.

3. The bottom shield of claim 1 wherein each of the plurality of notches along the first edge corresponds to one of the plurality of notches along the second edge.

4. The bottom shield of claim 3 wherein one of the plurality of domain walls intersects both a valley of one of the plurality of notches along the first edge and a valley of a corresponding notch along the second edge such that each of the plurality of domain walls is parallel to the air bearing surface.

5. The bottom shield of claim 4 wherein an acute angle formed between an intersection of an extension of any of the plurality of magnetic domain walls and the first edge at the valley of one of the plurality of notches is inversely related to the strength of a force required to move any of the plurality of domain walls.

6. The bottom shield of claim 4 wherein a positioning of each of the plurality of notches is periodic.

7. The bottom shield of claim 4 wherein a period of the positioning of each of the plurality of notches equals an equilibrium domain period, the equilibrium domain period being an average width of a magnetic domain in a demagnetized sample shield that has a total magnetic moment equal to zero and an outer dimension equal to an outer dimension of the bottom shield.

8. A magnetic read head comprising:
   a top shield;
   a bottom shield having a plurality of spaced notches located along a length of the bottom shield, the plurality of spaced notches forming a plurality of narrow widths that are each narrower than an outer width of the bottom shield, and a plurality of magnetic domain walls, wherein one of the plurality of magnetic domain walls is located at each of the plurality of narrower widths; and
   a read element positioned between the top shield and the bottom shield.

9. The magnetic read head of claim 8 wherein the bottom shield is formed of an anisotropic material having an easy axis parallel to an air bearing surface of the magnetic read head.

10. The magnetic read head of claim 8 wherein each of the plurality of magnetic domain walls in the bottom shield is parallel to an air bearing surface of the magnetic read head.

11. The bottom shield of claim 10 wherein an acute angle formed between an intersection of an extension of any of the plurality of magnetic domain walls and the first edge at the valley of one of the plurality of notches is inversely related to the strength of a force required to move any of the plurality of domain walls.

12. The magnetic read head of claim 11 wherein a positioning of each of the plurality of notches in the bottom shield is periodic.

13. The magnetic read head of claim 10 wherein a period of the positioning of each of the plurality of notches in the bottom shield equals an equilibrium domain period, the equilibrium domain period being an average width of a magnetic domain in a demagnetized sample shield that has a total magnetic moment equal to zero and an outer dimension equal to an outer dimension of the bottom shield.

14. A bottom shield for use in a magnetic read head, the bottom shield comprising:
   a ferromagnetic layer having a length and an outer width, the ferromagnetic layer further having a first edge, a second edge opposite the first edge, and an air bearing surface, the first edge and the second edge each being normal to the air bearing surface;
   a plurality of periodically-spaced notches located along both the first edge and the second edge, wherein each of the plurality of notches along the first edge corresponds to one of the plurality of notches along the second edge so that a line that connects a valley of one of the plurality of periodically-spaced notches along the first edge and a valley of a corresponding notch along the second edge is parallel to the air bearing surface;
   a plurality of narrow widths that are each narrower than the outer width of the bottom shield; and
   wherein a period of the periodically spaced notches equals an equilibrium domain period, the equilibrium domain period being an average width of a magnetic domain in a demagnetized sample shield that has a total magnetic moment equal to zero and an outer dimension equal to an outer dimension of the bottom shield.

15. The bottom shield of claim 14 wherein the ferromagnetic layer is formed of an anisotropic material having an easy axis parallel to the air bearing surface of the bottom shield.

16. The bottom shield of claim 15 wherein an acute angle formed between an intersection of an extension of any of the plurality of magnetic domain walls and the first edge at the valley of one of the plurality of notches is inversely related to the strength of a force required to move any of the plurality of domain walls.

* * * * *